F. S. KERN.
HEADLIGHT.
APPLICATION FILED OCT. 16, 1920.
1,417,607.
Patented May 30, 1922.
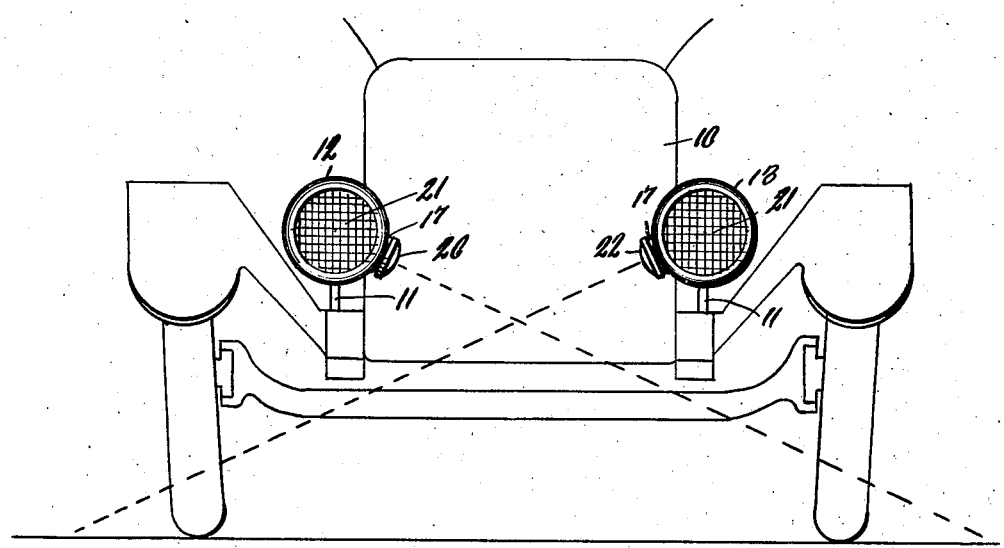
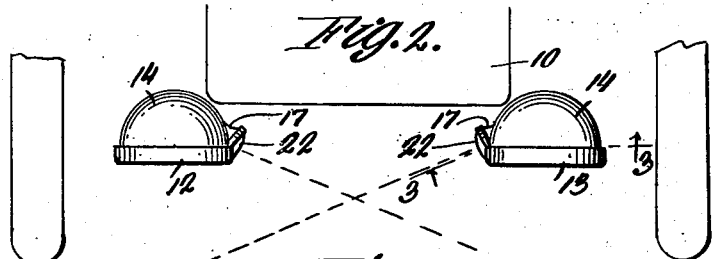
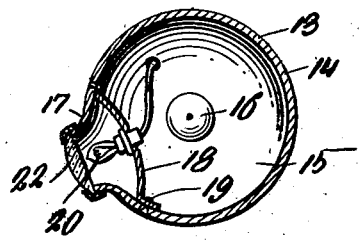
WITNESSES
FRANKLIN S. KERN INVENTOR.
BY
ATTORNEY.

UNITED STATES PATENT OFFICE.

FRANKLIN S. KERN, OF LIBERTYVILLE, ILLINOIS.

HEADLIGHT.

1,417,607.   Specification of Letters Patent.   Patented May 30, 1922.

Application filed October 16, 1920. Serial No. 417,368.

*To all whom it may concern:*

Be it known that I, FRANKLIN S. KERN, a citizen of the United States, residing at Libertyville, in the county of Lake and State of Illinois, have invented certain new and useful Improvements in Headlights, of which the following is a specification.

This invention relates to headlights for automobiles and other vehicles and has for its principal object to provide simple and efficient lighting means for the side of the road adjacent the front wheels of the vehicle.

As is well known the headlights now commonly in use reflect their rays straight ahead and the side of the road adjacent the front wheels is not lighted so that it is not possible for the operator of the vehicle to see the side of the road to which he may be turning.

A further object of the invention is to provide a headlight of this character which may be cheaply manufactured and which will be efficient and reliable in operation so as to accomplish the function desired therefor.

In order that those skilled in this art may have a full understanding of the invention, I have illustrated a desirable and preferred embodiment of the same in the accompanying drawing forming a part of this specification, and throughout the various views of which like reference characters refer to the same parts.

In the drawing:

Figure 1 is a front elevation of a vehicle showing my headlights attached thereto, Figure 2 is a top plan view of the headlights, and Figure 3 is a section taken on the line 3—3 of Figure 2 looking in the direction of the arrow.

Referring to the drawing in detail it will be seen that 10 designates a vehicle of any preferred construction having the usual upright standards 11 for supporting the headlights 12 and 13. The headlight 12 is disposed to the right of the vehicle while the headlight 13 is disposed to the left thereof. Each headlight consists of a main lamp and a side lamp. The main lamp consists of the casing 14 having a reflector 15 situated therein and any preferred source of light 16. The side lamp comprises a casing 17 formed integral with the casing 14 and a reflector 18 which is attached to the reflector 15 by means of rivets 19 and supports the source of light 20. The main lamp is provided with the circular window 21 while the side lamp is provided with the window 22. It will be noted that the side lamp on the headlight 12 is disposed in the second quadrant of the window 21 so as to reflect the light in front and to the side of the left front wheel whereas the side lamp in the headlight 13 is disposed in the third quadrant of the window 21 so as to throw its light in front and to the side of the front wheel to the right of the vehicle. It will also be noted that the planes of the side lamps are disposed at angles to the plane of the windows of the main lamps and thus the lights from the side lamps will always be thrown to the front of the vehicle and downwardly so as to in no way interfere with the operator of an oncoming vehicle.

Obviously, the invention is not limited or restricted to the precise and exact details of construction as illustrated and described, because it is susceptible of a variety of embodiments, and many minor mechanical changes may be made in such preferred incorporation of the invention without departing from the substance or essence of the invention and without the sacrifice of any of its substantial benefits and advantages within the scope of the invention as claimed.

Having thus described my invention what I claim as new is:

In combination, a support, a pair of headlights mounted on the support in spaced relation to each other, each headlight comprising a main casing, a reflector, a source of light, and a window, and a side lamp comprising a casing formed integral with the casing of the headlight, a source of light, a reflector and a window for the side lamp, the plane of the window and the side lamp being disposed at an angle to the plane of the window of the main lamp and the windows of the side lamps being disposed so as to be adjacent each other and in one of the lower quadrants of the window of the main lamp.

In testimony whereof I affix my signature in presence of two witnesses.

FRANKLIN S. KERN.

Witnesses:
S. C. KIMBALL,
E. H. WHEELER.